United States Patent [19]

Endo

[11] Patent Number: 4,500,187

[45] Date of Patent: Feb. 19, 1985

[54] SHUTTER ARRANGEMENT

[75] Inventor: Takashi Endo, Tokyo, Japan

[73] Assignee: Canon Kabushiki Kaisha, Japan

[21] Appl. No.: 393,300

[22] Filed: Jun. 29, 1982

[30] Foreign Application Priority Data

Jul. 7, 1981 [JP] Japan .............................. 56-105986

[51] Int. Cl.³ ............................................. G03B 17/38
[52] U.S. Cl. ................................................... 354/266
[58] Field of Search ................ 354/25, 195, 234, 235,
354/237, 266, 268, 195.1

[56] References Cited

U.S. PATENT DOCUMENTS

| 4,212,522 | 7/1980 | Kitai et al. | 354/234 X |
| 4,229,089 | 10/1980 | Kitai et al. | 354/266 X |
| 4,297,015 | 10/1981 | Matsumoto et al. | 354/266 X |
| 4,367,935 | 1/1983 | Kuge et al. | 354/195 X |

*Primary Examiner*—John Gonzales
*Attorney, Agent, or Firm*—Toren, McGeady and Stanger

[57] ABSTRACT

A shutter mechanism for a camera wherein, when a release button is depressed, a main release plate is moved to release a running plate from a latching connection. An auxiliary release plate follows up the main release plate until it comes into frictional contact with the running plate, as the latter runs down, whereby the speed of movement of the running plate is regulated. When the running plate has moved a predetermined distance, the auxiliary release plate is left behind and then allowed to move and a shutter release operation is actuated.

23 Claims, 2 Drawing Figures

SHUTTER ARRANGEMENT

BACKGROUND OF THE INVENTION

1. Field of the Invention

This invention relates to shutter arrangements for cameras, and more particularly to a shutter arrangement wherein the timing of closing movement of the shutter blades is controlled by an electromagnet.

2. Description of the Prior Art

In a shutter arrangement wherein the timing of the closing movement of the shutter blades is controlled by an electromagnet, and wherein the shutter closing member is held stationary by attraction to the electromagnet in response to actuation of a camera release, it is required to make sure that the electromagnet is operated at its highest attraction efficiency to hold the shutter closing member before the start of the opening movement of the shutter blades. In general, however, the electromagnets necessarily require a certain adequate time from the start of current supply thereto in order to attain production of a stable attractive force. In the art of such shutter arrangements, therefore, it has been conventional practice for the effective stroke of the release member to be elongated, or for the bias force of the release member to be strengthened.

Even with the use of such an approach, when the release button is pushed down extraordinarily fast, it often occurs that the start of the opening movement of the shutter blades is released before the attractive force of the electromagnet becomes stable. Thus, the shutter opening operation and the shutter closing operation overlap each other. In net effect, no exposure of the film takes place and the film is wastefully advanced by one frame with a valuable photographic opportunity being missed.

On the other hand, in recent years, there have been proposed a wide variety of built-in automatic focus adjusting devices for cameras. Since this type of camera requires that the stop of the photographic objective in an in-focus position be followed by the start of an opening operation of the shutter, it is proposed that when a member which is operatively connected to the photographic objective lens reaches the terminal end of movement, the shutter be released by this member. Such a device is disclosed in U.S. Pat. No. 4,209,242 (issued Jun. 24, 1980). Since, however, this device has a running member arranged upon operation of the release member to start movement and upon arriving in a predetermined distance to strike a latch member which has so far held the shutter blades in the cocked position so that the shutter blades are released from latching connection and start to open, there is a need for providing a governor mechanism for maintaining a constant speed of running movement of the aforesaid running member. That is, in such a device, if the governor mechanism is not used, a problem arises in that when the running member is in operation, only the spring power acts on the running member, causing the latter to move at high speeds and thus the focus adjusting operation cannot be accurately controlled. Also, in this case, it occurs that the release actuation is immediately followed by the start of the opening movement of the shutter blades. As has been stated above, therefore, when applied to a shutter arrangement wherein the timing of the closing operation of the shutter blades is controlled by the attraction type electromagnet actuator, it is impossible to avoid failure to expose the film.

SUMMARY OF THE INVENTION

With the foregoing in mind, it is an object of the present invention to provide a shutter arrangement of very simple form while still avoiding overlap of the opening and closing movements of the shutter.

Another object of the present invention is to provide a shutter arrangement of very simple form while still permitting an opening operation of the shutter to start after the termination of a focus adjusting operation.

These and other objects of the invention will become apparent from the following description of an embodiment thereof taken in connection with the accompanying drawings.

DETAILED DESCRIPTION OF THE PREFERRED EMBODIMENTS

Figure 1:
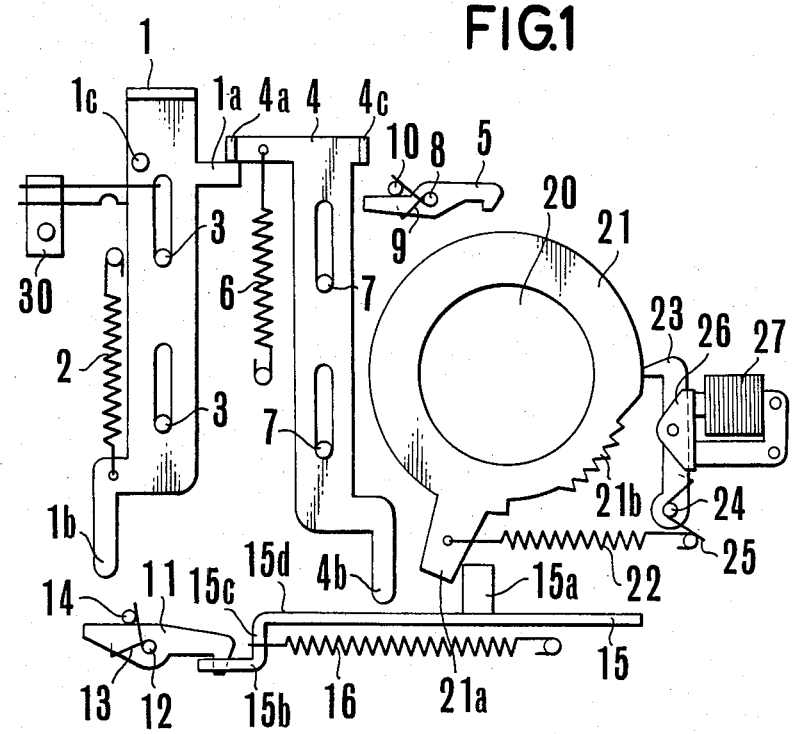
FIG. 1 is an elevational view illustrating an embodiment of the invention.

In FIG. 1, a main release plate 1 formed as a unit with a release button (not shown) is urged by a spring 2 in an upward direction as viewed in the drawing, and vertically movably supported by guide pins 3. An auxiliary release plate 4 is arranged upon movement thereof to actuate a release lever 5 so that shutter blades (not shown) are released to open, the plate 4 being urged by a spring 6 which is weaker than the spring 2 in a downward direction as viewed in the drawing, while its extension 4a abuts on an extension 1a of the main release plate 1, so that the auxiliary release plate 4 follows the main release plate 1. Guide pins 7 slidably support the auxiliary release plate 4. The release lever 5 initiating opening of the shutter blades is given a clockwise rotative force by a spring 9 with a shaft 8 as the rotation axis with its rotation being limited by a stopper 10. 11 is a latch lever which is given a clockwise rotative force by a spring 13 with a shaft 12 as the rotation axis, and whose rotation is limited by a stopper 14. Also, 15 is a running plate which is given a rightward bias force as viewed in the drawing by a spring 16, and which is operatively connected to a winding up mechanism (not shown) known to those skilled in the art so that when winding-up is completed, a cutout hole 15b engages the latch lever 11 as illustrated, whereby a set position is assumed.

This running plate 15 has a side surface 15d on which rides an end portion 4b of the auxiliary release plate 4 as the auxiliary release plate 4 moves downwards under the action of the spring 6 in response to pushing down of the main release plate 1, so that the auxiliary release plate 4 is hindered from further downward movement, the plate 5 having a stepped portion 15c at a location such that when the running plate 15 has moved to a predetermined distance in a rightward direction as viewed in the drawing, the contact of the end portion 4b and side portion 15d is released. That is, the running plate 15 has functions such that when the auxiliary release plate 4 is moving downwards by the action of the spring 6, its movement is temporarily hindered by the side surface 15d, and when it has run down by a predetermined distance until the neighborhood of the terminal end of running down movement, the auxiliary release plate 4 is allowed to further move along the shoulder of the stepped portion 15c. Also the direction of movement of the auxiliary release plate 4 is almost normal to the direction of movement of the running plate 15 so that when the end portion 4b is pressed against the side surface 15d of the running plate 15 by the bias force of the spring 16, its frictional force can regulate the running speed of the running plate 15 to a predetermined value.

20 is an objective lens; 21 is a barrel ring operating in unison with the objective lens 20 to which there is imparted a counterclockwise rotative force by a spring 22 so that when the running plate 15 is set, a bent portion 15a of the running plate 15 restrains a projected portion 21a of the barrel ring 21 from movement to hold the barrel ring 21 in a charged position against the spring 22. 23 is an AF control lever to which there is imparted a counterclockwise rotative force by a spring 25 with a shaft 24 as the axis of rotation, this rotation being limited by the periphery of the barrel ring 21. Also, the AF control lever 23 is provided with an armature 26 formed as a unit therewith which is to be attracted when in automatic focus adjusting operation, whereby engagement of the AF control lever 23 with a toothed portion 21b of the barrel ring 21 is controlled.

30 is a switch arranged upon downward movement of the main release plate 1 to be turned on through a pin 1c. When this switch 30 is turned on, an electromagnet (not shown) controlling the closing operation of the shutter blades starts to be supplied with current. It is noted that such construction and arrangement is known to those skilled in the art, and therefore, no more detailed explanation is given here.

In the operation of this embodiment when a release button is pushed down, the main release plate 1 is moved from the illustrated position against the spring 2, while the auxiliary release plate 4 follows up the main release plate 1 until its end portion 4b abuts on the side surface 15d of the running plate 15, whereby the auxiliary release plate 4 is restrained from further movement. Subsequently, the power switch or switch 30 is closed by the downward movement of the main release plate 1 to start current supply to the electromagnet (not shown) for control of the closing operation of the shutter blades, and also to the electromagnet 27 whereby the AF control lever 23 is held in the illustrated position. From the position where the end portion 4b of the auxiliary release plate 4 contacts with the side surface 15d of the running plate 15 the main release plate 1 is then moved further downwards under the pressure of the bias force of the spring 6 until its end portion 1b strikes the latch lever 11 at its left end to release the running plate 15 from the latching connection.

When latching of the running plate 15 is released, the running plate 15 starts to move to the right as viewed in the drawing. As the running plate 15 moves to the right, the barrel ring 21 also turns in the counterclockwise direction by the spring 22. Since, at this time, the end portion 4b of the auxiliary release plate 4 is pressed against the side surface of the running plate 15, it results that the running plate 15 runs down while its speed is regulated by the end portion 4b.

Such rotation of the barrel ring 21 causes backward movement of the objective lens 20 to an in-focus position at which an automatic focus adjusting device (not shown) known to those skilled in the art produces an actuating signal which is then applied to cut off the current supply to the electromagnet 27. Thereupon the attractive force of the electromagnet 27 disappears, causing the AF control lever 23 to turn in the counterclockwise direction by the spring 25 which in turn causes its pawl to engage one of the teeth 21b of the barrel ring 21, thus arresting the rotating barrel ring 21 with the objective lens 20 in the in-focus position.

After the running plate 15 has run down by a stroke corresponding to the maximum possible angle of rotation of the barrel ring 21, the side surface 15d of the running plate 15 is moved away from the end portion 4b of the auxiliary releaae plate 4. Then, since the stepped portion 15c is positioned below the end portion 4b as viewed in the drawing, the auxiliary release plate 4 is moved downwards by the spring. At this time, the projected portion 4c pushes the release lever 5 at the left side thereof, and turns the release lever 5 in the counterclockwise direction, whereby the shutter blades (not shown) are released from the latching connection to start an opening operation. The result is that in the predetermined time interval from the closure of the switch 30 the shutter release is actuated. Thereupon an exposure of the film is initiated, and an exposure control circuit (not shown) starts to count the exposure time. At the termination of duration of the exposure time, the aforesaid exposure control circuit stops the current supply to the electromagnet (not shown) for controlling the closing operation of the shutter blades, thus initiating a closing operation of the shutter blades. By this, the shutter operation is completed.

Also, after a series of operations have ended, when the finger is removed from the main release plate 1, the main release plate 1 returns upwards as viewed in the drawing along with the auxiliary release plate 4. Further by the winding-up mechanism (not shown) the running plate 15 is moved to the left against the spring 16 and then latched up by the latch lever 11. Thus, the set position of FIG. 1 is taken again.

Figure 2:
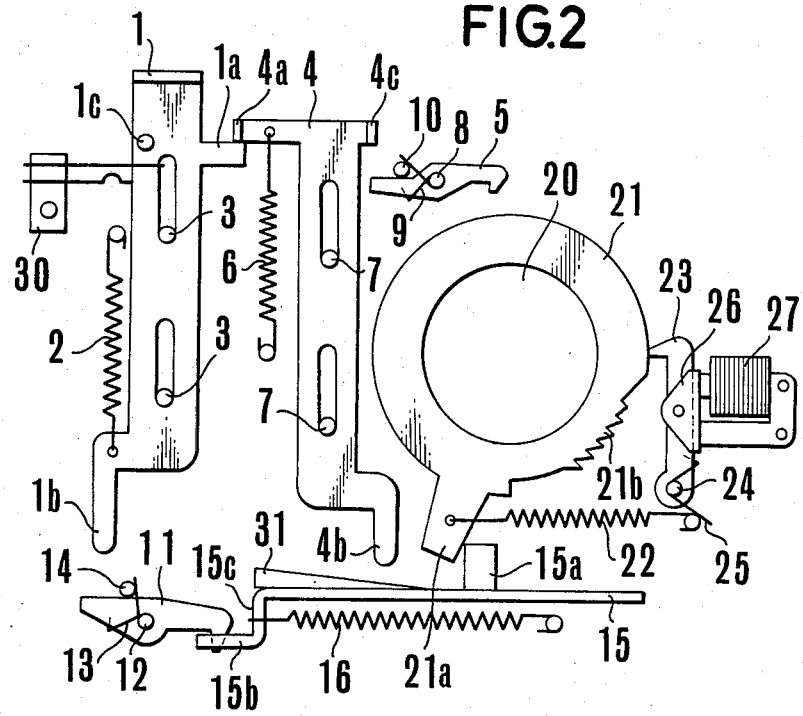
FIG. 2 is an elevational view illustrating another embodiment of the invention.

Next, FIG. 2 illustrates another embodiment of the present invention, where the running plate 15 is provided with a cam 31 to contact with the end portion 4b of the auxiliary release plate 4. It is to be noted that the other parts are similar in construction and arrangement to those described in connection with the foregoing embodiment and their explanation is not repeated here.

In this embodiment, as the main release plate 1 moves downwards as viewed in the drawing, when the auxiliary release plate 4 moves downwards as viewed in the drawing by the bias force of the spring 6, its end portion 4b comes into abutting engagement on the cam 31, whereby its movement is once stopped. After that, the latch lever 11 is turned in the counterclockwise direction by the end portion 1b of the main release plate 1, causing the start of rightward movement of the running plate 15 as viewed in the drawing which causes the cam 31 also to move while lifting the auxiliary release plate 4 upwards against the spring 6. Therefore, the running plate 15 while receiving the bias force to the spring 6 as a resistance is moved to the right as viewed in the drawing with the result that its running speed is somewhat adjusted.

It is to be noted that if the slope of this cam 31 is made arbitrarily adjustable, it becomes possible to adjust the speed of the running plate 15 with ease.

As has been described in greater detail, the present invention contemplates the use of a release member for releasing the shutter from the latching connection in combination with a running member, the arrangement of these parts being such that when a camera release is actuated, the running member starts to run down under the condition that the release member is pressed against it, and, as the aforesaid running member has moved a predetermined distance, when the release member is released from the blocking contact with the running member, the aforesaid release member is caused to move to effect the start of an opening movement of the shutter. This makes it possible to assure that an accident, which would be otherwise encountered by the simultaneous occurrence of the opening and closing operations of the shutter to prevent exposure of the film, is avoided. In addition thereto, there is no need for using a governor mechanism acting on the running member. Therefore, the aforesaid advantages can be produced by a very simple construction and arrangement, and this feature is suited for use in smaller cameras.

Also when the present invention is built into cameras having automatic focus adjusting devices, the stop of the focusing operation of the objective lens and the start of the shutter operation can be easily co-ordinated with each other and film exposure during an out-of-focus condition can be securely prevented.

While specific embodiments of the invention have been shown and described in detail to illustrate the application of the inventive principles, it will be understood that the invention may be embodied otherwise without departing from such principles.

What I claim:

1. A shutter arrangement for a camera including a shutter with shutter blades and an electromagnet wherein closing operation of said shutter blades is controlled by said electromagnet comprising:
   release means adapted to be actuated by application of a force thereto;
   running means;
   first bias means applying a force to move said running means;
   latch means holding said running means in a predetermined position against the force of said first bias means, said latch means being responsive to the action of said release means for releasing said running means;
   actuating means arranged to initiate opening operation of said shutter blades when said running means reaches a certain position; and
   delay means responsive to the action of said release means thereby to be moved into abutting contact with said running means;
   said delay means operating to delay movement of said running means thereby to restrain said actuating means from initiating opening operation of said shutter blades until normal operation of said electromagnet is achieved.

2. A shutter arrangement according to claim 1 wherein said delay means includes second bias means urging said delay means in a direction toward abutting contact with said running means.

3. A shutter arrangement according to claim 2 wherein said latch means is arranged to operate to release said running means after said delay means has contacted wih said running means.

4. A shutter arrangement according to claim 3 further including switching means responsive to the action of said release means for starting current supply to said electromagnet, said switching means being arranged to start operation before said latch means releases said running means in response to movement of said release means.

5. A shutter arrangement according to claim 3 wherein said running means has a cam portion for displacing said delay means.

6. A shutter arrangement according to claim 5 further including means for putting said actuating means into action when said delay means is displaced at said certain position by movement of said running means.

7. A shutter arrangement according to claim 3 wherein said running means has a camming portion engaging an abutment portion of said delay means for displacing said delay means against the force of said second bias means.

8. A shutter arrangement according to claim 1 wherein said delay means is arranged to be pressed against said running means from a direction almost perpendicular to the direction of movement of said running means.

9. A shutter arrangement for a camera including a shutter with shutter blades and an electromagnet wherein closing operation of said shutter blades is controlled by said electromagnet comprising:
   release means adapted to be actuated by application of a force thereto;
   running means;
   first bias means applying a force to move said running means;
   latch means holding said running means in a predetermined position against the force of aid first bias means, said latch means being responsive to the action of said release means for releasing said running means;
   actuating means arranged to initiate opening operation of said shutter blades when said running means reaches a certain position; and
   delay means arranged in abutting engagement with said running means from a direction at least approximately perpendicular to the path of movement thereof to effect delay in the movement of said running means;
   said delay means operating to delay movement of said running means thereby to restrain said actuating means from initiating opening operation of said shutter blades until normal operation of said electromagnet is achieved;
   said delay means being arranged to come in contact with said running means in response to operation of said release means.

10. A shutter arrangement according to claim 9 wherein said latch means is arranged to operate to release said running means after said delay means has contacted with said running means.

11. A shutter arrangement according to claim 10 further including switching means responsive to the action of said release means for starting current supply to said electromagnet, said switching means being arranged to start operation before said latch means releases said running means in response to movement of said release means.

12. A shutter arrangement according to claim 10 wherein said running means has a stepped portion for displacing said delay means in said certain position.

13. A shutter arrangement according to claim 12 wherein said delay means operates to make said actuating means responsive to displacement of said delay means at said stepped portion of said running means for releasing said latch means from engagement with said running means.

14. A shutter arrangement according to claim 10 wherein said running means has a camming portion engaging an abutment portion of said delay means for displacing said delay means against the force of said second bias means.

15. In a camera including a photographic lens, a shutter having shutter blades and an automatic focusing mechanism wherein automatic focusing adjustment of said photographic lens and an exposure operating consisting of opening and closing of said shutter blades are performed in sequence, the combination comprising:

release means adapted to be actuated by application of a force thereto;
   running means;
   first bias means applying a force to move said running means;
   latch means holding said running means in a predetermined position against the force of said first bias means, said latch means being responsive to the action of said release means for releasing said running means;
   actuating means arranged to initiate opening operation of said shutter blades when said running means reaches a certain position; and
   delay means arranged in abutting engagement with said running means from a direction at least approximately perpendicular to the path of movement thereof to effect delay in the movement of said running means;
   said delay means operating to delay movement of said running means thereby to restrain said actuating means from initiating opening operation of said shutter blades until automatic focus adjustment of said photographic lens is completed;
   said photographic lens being arranged to move in response to movement of said running means;
   said delay means including second bias means urging said delay means in an abutting direction with said delay means being arranged to come in contact with said running means in response to operation of said release means.

16. The combination according to claim 15 wherein said latch means is arranged to operate to release said running means after said delay means has contacted with said running means.

17. The combination according to claim 15 wherein said delay means is arranged to come in contact with said running means from a direction almost perpendicular to the direction of movement of said running means.

18. A camera including:
   (a) control means for controlling a sequence of operations of said camera, said control means while moving in a prescribed direction causing said operations to occur in sequence;
   (b) bias means for driving movement of said control means in said prescribed direction;
   (c) stopping means for stopping said control means in a prescribed position against the bias force of said bias means;
   (d) release means for releasing the action of said stopping means;
   (e) delay means arranged to abut on said control means in response to actuation of said release means so that movement of said control means is delayed, said delay means delaying the movement of said control means to insure that the sequence of operations of the camera will normally take place.

19. A camera according to claim 18 wherein said release means is arranged to release the action of said stopping means after said delay means has abutted on said control means.

20. A camera according to claim 18 wherein said delay means includes second bias means urging said delay means in an abutting direction.

21. A camera according to claim 20 wherein said control means has a camming portion engaging an abutment portion of said delay means for displacing said delay means against the force of said second bias means.

22. A camera according to claim 18 further including:
   (f) electromagnetic means for controlling an exposure operation; and
   (g) switching means for initiating a current supply to said electromagnetic means, said switching means being arranged to start an operation before the action of said stopping means is released.

23. A camera according to claim 18 wherein said delay means is arranged to abut on said control means from a direction almost perpendicular to the direction of movement of said control means.

* * * * *